United States Patent 
Sita (10) Patent No.: US 7,541,412 B2
(45) Date of Patent: Jun. 2, 2009

(54) PROCESS FOR PREPARATION OF POLYOLEFINS VIA DEGENERATIVE TRANSFER POLYMERIZATION

(75) Inventor: Lawrence R. Sita, Silver Spring, MD (US)

(73) Assignee: University of Maryland, College Park, College Park, MD (US)

( * ) Notice: Subject to any disclaimer, the term of this patent is extended or adjusted under 35 U.S.C. 154(b) by 53 days.

(21) Appl. No.: 11/698,975

(22) Filed: Jan. 29, 2007

(65) Prior Publication Data

US 2007/0203310 A1    Aug. 30, 2007

Related U.S. Application Data

(63) Continuation-in-part of application No. 10/740,826, filed on Dec. 22, 2003, now Pat. No. 7,183,364.

(60) Provisional application No. 60/435,432, filed on Dec. 20, 2002, now abandoned.

(51) Int. Cl.
*C08F 4/68* (2006.01)
*C08F 2/04* (2006.01)

(52) U.S. Cl. .............. 526/169.2; 526/161; 526/172; 526/943; 526/941; 526/134; 526/348.2; 526/348.3; 526/348.5; 526/348.6; 526/348; 526/336; 526/339; 526/340.2; 526/340.3; 526/79; 526/87

(58) Field of Classification Search .......... 526/172, 526/160, 161, 348, 169, 169.2, 79, 87
See application file for complete search history.

(56) References Cited

U.S. PATENT DOCUMENTS

| | | | |
|---|---|---|---|
| 3,175,999 A | 3/1965 | Natta et al. | |
| 3,903,017 A | 9/1975 | Ziegler et al. | |
| 4,335,225 A | 6/1982 | Collette et al. | |
| 4,522,982 A | 6/1985 | Ewen | |
| 4,530,914 A | 7/1985 | Ewen et al. | |
| 5,162,466 A | 11/1992 | Karol et al. | |
| 5,214,173 A | 5/1993 | Jordan et al. | |
| 5,317,036 A | 5/1994 | Brady, III et al. | |
| 5,318,935 A | 6/1994 | Canich et al. | |
| 5,391,629 A * | 2/1995 | Turner et al. ......... | 525/268 |
| 5,527,752 A | 6/1996 | Reichle et al. | |
| 5,594,080 A | 1/1997 | Waymouth et al. | |
| 5,674,795 A | 10/1997 | Wasserman et al. | |
| 5,681,908 A | 10/1997 | Mehra et al. | |
| 5,726,332 A | 3/1998 | Eisch et al. | |
| 5,756,614 A | 5/1998 | Chien et al. | |
| 5,866,659 A | 2/1999 | Chung et al. | |
| 5,912,202 A | 6/1999 | Oskam et al. | |
| 5,969,070 A | 10/1999 | Waymouth et al. | |
| 6,063,105 A | 5/2000 | Totakura | |
| 6,211,311 B1 * | 4/2001 | Wang et al. ......... | 526/131 |
| 6,429,274 B1 | 8/2002 | Siedle et al. | |
| 6,448,358 B2 | 9/2002 | Siedle et al. | |
| 6,541,583 B2 | 4/2003 | Meverden et al. | |
| 6,579,998 B2 * | 6/2003 | Sita et al. ........... | 556/53 |
| 6,737,487 B2 | 5/2004 | Meverden | |
| 6,777,476 B2 | 8/2004 | Jeong et al. | |
| 7,053,157 B2 * | 5/2006 | Sita et al. ........... | 526/86 |
| 7,183,364 B2 * | 2/2007 | Sita ................... | 526/172 |
| 2004/0186253 A1 | 9/2004 | Sita | |

FOREIGN PATENT DOCUMENTS

| | | |
|---|---|---|
| EP | 0 416 815 A2 | 3/1991 |
| WO | WO 96/08519 A2 | 3/1996 |
| WO | WO 98/30606 A1 | 7/1998 |
| WO | WO 01/30858 A1 | 5/2001 |
| WO | WO 03/008459 A1 | 1/2003 |
| WO | WO 2006/102106 A1 | 9/2006 |
| WO | WO 2006/102119 A2 | 9/2006 |

OTHER PUBLICATIONS

Cannizzo et al. Macromolecules, 1988, 21, 1961-1967.*
Epshteyn et al. J. Am. Chem. Soc., 2006, 128, 16052-16053.*
U.S. Appl. No. 11/886,536, Sita et al., International filing date of Mar. 17, 2006, now published as WO 06/102119 A2.*
U.S. Appl. No. 11/886,535, Sita et al., International filing date of Mar. 17, 2006, now published as WO 06/102106 A1.*
Andresen, A., et al., "Halogen-Free Soluble Ziegler Catalysts for the Polymerization of Ethylene. Control of Molecular Weight by Choice of Temperature," *Angew. Chem. Int. Ed. Engl.* 15: 630-632, VCH Verlagsgesellschaft (1976).
Asakura, T., et al., "Carbon-13 NMR Spectral Assignment of Five Polyolefins Determined from the Chemical Shift Calculation and the Polymerization Mechanism," *Macromolecules* 24:2334-2340, American Chemical Society (1991).
Babu, G. N., et al., "Microstructure of Poly(1-hexene) Produced by ansa-Zirconocenium Catalysis," *Macromolecules* 27:3383-3388, American Chemical Society (1994).

(Continued)

*Primary Examiner*—Vasu Jagannathan
*Assistant Examiner*—Rip A. Lee
(74) *Attorney, Agent, or Firm*—Sterne, Kessler, Goldstein & Fox P.L.L.C.

(57) ABSTRACT

Disclosed is a method of producing a polyolefin composition comprising contacting a metallocene pre-catalyst with a substoichiometric amount of a co-catalyst; adding a first olefin monomer; and polymerizing the first monomer for a time sufficient to form the polyolefin. The method allows for the use of a minimum amount of activating co-catalyst, and allows for the production of stereoregular and non-stereoregular polyolefins. The use of configurationally stable metallocene pre-catalysts allows for the production of monomodal isotactic polyolefins having narrow polydispersity. The use of configurationally unstable metallocene pre-catalysts allows for the production of monomodal atactic polyolefins having narrow polydispersity. The method of the present invention optionally further comprises contacting the polyolefin with a second amount of said co-catalyst; adding a second olefin monomer; polymerizing said second olefin monomer to form a block-polyolefin composition. Also disclosed are monomodal diblock copolymer compositions made according to the present invention.

40 Claims, 7 Drawing Sheets

OTHER PUBLICATIONS

Barner-Kowollik, C., et al., "Modeling the Reversible Addition-Fragmentation Chain Transfer Process in Cumyl Dithiobenzoate-Mediated Styrene Homopolymerizations: Assessing Rate Coefficients for the Addition-Fragmentation Equilibrium," *J. Polymer Sci.: Part A: Polymer Chem. 39*:1353-1365, John Wiley & Sons, Inc. (Published online Mar. 14, 2001).

Baumann, R., et al., "Synthesis of Titanium and Zirconium Complexes That Contain the Tridentate Diamido Ligand, [((t-Bu-$d_6$)N-o-$C_6H_4)_2O]^{2-}$ ([NON]$^{2-}$) and the Living Polymerization of 1-Hexene by Activated [NON]ZrMe$_2$," *J. Am. Chem. Soc. 119*: 3830-3831, American Chemical Society (1997).

Bochmann, M., and Lancaster, S.J., "Monomer-Dimer Equilibria in Homo- and Heterodinuclear Cationic Alkylzirconium Complexes and Their Role in Polymerization Catalysis," *Angew. Chem. Int. Ed. 33*:1634-1637, VCH Verlagsgesellschaft (1994).

Bravakis, A.M., et al., "Synthesis of Elastomeric Poly(propylene) Using Unsymmetrical Zirconocene Catalysts: Marked Reactivity Differences of 'Rac'- and 'Meso'-like Diastereomers," *Macromolecules 31*:1000-1009, American Chemical Society (1998).

Brintzinger, H.H., et al., "Stereospecific Olefin Polymerization with Chiral Metallocene Catalysts," *Angew. Chem. Int. Ed. Engl. 34*:1143-1170, VCH Verlagsgesellschaft (1995).

Britovsek, G.J.P. et al., "The Search for New-Generation Olefin Polymerization Catalysts: Life beyond Metallocenes," *Angew. Chem. Int. Ed. 38*:428-447, Wiley-VCH (1999).

Chen, Y.-X., et al., "Organo-Lewis Acids As Cocatalysts in Cationic Metallocene Polymerization Catalysis. Unusual Characteristics of Sterically Encumbered Tris(perfluorobiphenyl)borane," *J. Am. Chem. Soc. 118*:12451-12452, American Chemical Society (1996).

Chernega, A. N., et al., "Mono-η-cyclopentadienyl-benzamidinato Compounds of Titanium, Zirconium and Hafnium," *J. Chem. Soc. Chem. Commun.*, pp. 1415-1417, Royal Society of Chemistry (1993).

Coates, G.W., and Waymouth, R.M., "Oscillating Stereocontrol: A Strategy for the Synthesis of Thermoplastic Elastomeric Polypropylene," *Science 267*:217-219, American Association for the Advancement of Science (1995).

Coates, G.W., et al., "Catalysts For The Living Insertion Polymerization of Alkenes: Access to New Polyolefin Architectures Using Ziegler-Natta Chemistry," *Angew. Chem. Int. Ed. 41*:2237-2257, Wiley-VCH (2002).

Coughlin, E.B., et al., "Iso-Specific Ziegler-Natta Polymerization of .alpha.-Olefins with a Single-Component Organoyttrium Catalyst," *J. Am. Chem. Soc. 114*:7606-7607, American Chemical Society (1992).

De Rosa, C., et al., "Mechanical Properties and Elastic Behavior of High-Molecular-Weight Poorly Syndiotactic Polypropylene," *Macromolecules 36*:7607-7617, American Chemical Society (Published Online Sep. 12, 2003).

Ewen, J. A., "Mechanisms of Stereochemical Control in Propylene Polymerizations with Soluble Group 4B Metallocene/Methylalumoxane Catalysts," *J. Am. Chem. Soc. 106*:6355-6364, American Chemical Society (1984).

Ewen, J. A., "Symmetry rules and reaction mechanisms of Ziegler-Natta catalysts," *J. Mol. Cat. A: Chem. 128*:103-109, Elsevier (1998).

Hawker, C.J., "'Living' Free Radical Polymerization: A Unique Technique for the Preparation of Controlled Macromolecular Architectures," *Acc. Chem. Res. 30*:373-382, American Chemical Society (1997).

Hlatky, G.G., et al., "Ionic, Base-Free Zirconocene Catalysts for Ethylene Polymerization," *J. Am. Chem. Soc. 111*:2728-2729, American Chemical Society (1989).

Jayaratne, K.C., and Sita, L.R., "Direct Methyl Group Exchange between Cationic Zirconium Ziegler-Natta Initiators and Their Living Polymers: Ramifications for the Production of Stereoblock Polyolefins," *J. Am. Chem. Soc. 123*:10754-10755, American Chemical Society (2001).

Jayaratne, K.C., and Sita, L.R., "Stereospecific Living Ziegler-Natta Polymerization of 1-Hexene," *J. Am. Chem. Soc. 122*:958-959, American Chemical Society (2000).

Jayaratne, K.C., et al., "Living Ziegler-Natta Cyclopolymerization of Nonconjugated Dienes: New Classes of Microphase-Separated Polyolefin Block Copolymers via a Tandem Polymerization/Cyclopolymerization Strategy," *J. Am. Chem. Soc. 122*:10490-10491, American Chemical Society (2000).

Jia, L., et al., "Cationic Metallocene Polymerization Catalysts Based on Tetrakis(pentafluorophenyl)borate and Its Derivatives. Probing the Limits of Anion 'Noncoordination' via a Synthetic, Solution Dynamic, Structural, and Catalytic Olefin Polymerization Study," *Organometallics 16*:842-857, American Chemical Society (1997).

Keaton, R.J., et al., "Dramatic Enhancement of Activities for Living Ziegler-Natta Polymerizations Mediated by 'Exposed' Zirconium Acetamidinate Initiators: The Isospecific Living Polymerization of Vinylcyclohexane," *J. Am. Chem. Soc. 123*:6197-6198, American Chemical Society (2001).

Keaton, R.J., et al., "Regarding the Stability of $d^0$ Monocyclopentadienyl Zirconium Acetamidinate Complexes Bearing Alkyl Substituents with β-Hydrogens," *J. Am. Chem. Soc. 124*:5932-5933, American Chemical Society (2002).

Keaton, R.J., et al., "Structural Characterization of Zirconium Cations Derived from a Living Ziegler-Natta Polymerization System: New Insights Regarding Propagation and Termination Pathways for Homogenous Catalysts," *J. Am. Chem. Soc. 122*:12909-12910, American Chemical Society (2000).

Kesti, M. R., et al., "Homogeneous Ziegler-Natta Polymerization of Functionalized Monomers Catalyzed by Cationic Group IV Metallocenes," *J. Am. Chem. Soc. 114*:9679-9680, American Chemical Society (1992).

Koterwas, L. A., et al., "Stereospecific Syntheses, Metal Configurational Stabilities, and Conformational Analysis of meso-(R,S)- and (R,R)-($\eta^5$-$C_5R_5$)Ti(CH$_3$)$_2$-N,N'-bis(1-phenyleth-yl)acetamidinates for R=H and Me," *Organometallics 18*:4183-4190 (1999).

Mallin, D.T., et al., "rac-[Ethylidene(1-$\eta^5$-tetramethylcyclopentadienyl)(1-$\eta^5$-indenyl)]dichlorotitanium and Its Homopolymerization of Propylene to Crystalline-Amorphous Block Thermoplastic Elastomers," *J. Am. Chem. Soc. 112*:2030-2031, American Chemical Society (1990).

Matyjaszewski, K., and Müller, A.H.E., "Naming of Controlled, Living and 'Living' Polymerizations," *Macromolecular Nomenclature Note No. 12, The Nomenclature Committee of the ACS Division of Polymer Chemistry Guest Presentation*, pp. 1-6, last accessed online at http://www.chem.umr.edu/~poly/poly_link/nomcl/mnn12.html on Nov. 28, 2003.

Matyjaszewski, K., "Macromolecular Engineering by Controlled/Living Ionic and Radical Polymerizations," *Macromol. Symp. 174*:51-67, Wiley-VCH (2001).

Matyjaszewski, K., "Macromolecular Engineering by Controlled/Living Ionic and Radical Polymerizations," *Macromol. Symp. 174*:51-67, Wiley-VCH Verlag GmbH (Sep. 2001).

Mehrhodavandi, P., et al., "A Comparison of Cationic Zirconium Methyl and Isobutyl Initiators that Contain an Arylated Diamido-Pyridine Ligand for Polymerization of 1-Hexene. Elucidation of a Dramatic 'Initiator Effect'," *J. Am. Chem. Soc. 122*:7841-7842, American Chemical Society (2000).

Müller, A.H.E., et al., "Kinetic Analysis of 'Living' Polymerization Processes Exhibiting Slow Equilibria. 1. Degenerative Transfer (Direct Activity Exchange between Active and 'Dormant' Species). Application to Group Transfer Polymerization," *Macromolecules 28*:4326-4333, American Chemical Society (1995).

Müller, A.H.E., et al., "Kinetic Analysis of 'Living' Polymerization Processes Exhibiting Slow Equilibria. 2. Molecular Weight Distribution for Degenerative Transfer (Direct Activity Exchange between Active and 'Dormant' Species) at Constant Monomer Concentration," *Macromolecules 28*:7335-7338, American Chemical Society (1995).

Scollard, J. D., and McConville, D. H., "Living Polymerization of .alpha.-Olefins by Chelating Diamide Complexes of Titanium," *J. Am. Chem. Soc. 118*:10008-10009, American Chemical Society (1996).

Sita, L. R., and Babcock, J. R., "Rapid Access to Dimethylcyclopentadienyltitanium(IV) Amidinate, ($C_5R_5$)TiMe$_2$[NR$^1$C(R$^2$)NR$^3$] (R=H and Me; R$^2$=Me), Libraries," *Organometallics 17*:5228-5230, American Chemical Society (1998).

Vollmerhaus, R., et al., "Ethylene Polymerization Using β-Diketimine Complexes of Zirconium," *Organometallics 19*:2161-2169, American Chemical Society (2000).

Yang, X., et al, "'Cation-like' Homogenous Olefin Polymerization Catalysts Based upon Zirconocene Alkyls and Tris(pentafluorophenyl)borane," *J. Am. Chem. Soc. 113*:3623-3625, American Chemical Society (1991).

Zhang, Y., et al., "Degenerative Transfer Living Ziegler-Natta Polymerization: Application to the Synthesis of Monomodal Stereoblock Polyolefins of Narrow Polydispersity and Tunable Block Length," *J. Am. Chem. Soc. 125*:9062-9069, American Chemical Society (published on Internet Jul. 3, 2003).

Zhang, Y., et al., "Stereospecific Living Ziegler-Natta Polymerization via Rapid and Reversible Chloride Degenerative Transfer between Active and Dormant Sites," *J. Am. Chem. Soc. 126*:7776-7777, American Chemical Society (2004).

"Living Radical Polymerization," *Tharani's "Living" Radical Polymerization Page*, pp. 1-5, last updated Sep. 17, 1997, last accessed online at http://www.geocities.com/Athens/Forum/3682/lrp.html on Nov. 20, 2003.

"Metallocene as Olefin Polmerization Catalysts: An Introduction," available on-line at: http://www.chem.ucalgary.ca/groups/ziegler/met_intro.html (first accessed Jun. 16, 2005; last accessed Dec. 13, 2005).

\* cited by examiner

Initiation

Propagation

PROCESS FOR PREPARATION OF POLYOLEFINS VIA DEGENERATIVE TRANSFER POLYMERIZATION

CROSS-REFERENCE TO RELATED APPLICATIONS

This application is a Continuation-in-Part of U.S. application Ser. No. 10/740,826, filed Dec. 22, 2003, which is a nonprovisional of U.S. Provisional Appl. No. 60/435,432, filed Dec. 20, 2002, each of which is incorporated herein by reference in its entirety.

Part of the work performed during development of this invention utilized U.S. Government funds. The work was partly funded by the National Science Foundation Grant CHE-0092493. The U.S. Government has certain rights in this invention.

BACKGROUND OF THE INVENTION

1. Field of the Invention

The present invention relates to a novel method of olefin polymerization that allows for the production of monomodal stereoblock polyolefins of tunable composition, molecular weight, and polydispersity.

2. Related Art

Living polymerizations that occur with reversible deactivation of the propagating centers during propagation, i.e., the reversible formation of inactive or "dormant" species, have now been documented for anionic, cationic, group transfer, and controlled/living free radical polymerizations (Matyjaszewski, K., *Macromol. Symp.* 174:51-67 (2001), and references cited therein; Müller, A. H. E., et al., *Macromolecules* 28:4326-4333 (1995); Müller, A. H. E., et al., *Macromolecules* 28:7335-7338 (1995); Hawker, C. J., *Acc. Chem. Res.* 30:373-382 (1997)). Slow exchange between active and dormant species, relative to propagation, can lead to a broadening of molecular weight distributions over those for living polymerizations in which such exchange processes are absent (cf., $M_w/M_n$ (polydispersity index, PDI) >1.1 vs. <1.1, respectively) (Matyjaszewski, K., *Macromol. Symp.* 174:51-67 (2001), and references cited therein; Müller, A. H. E., et al., *Macromolecules* 28:4326-4333 (1995); Müller, A. H. E., et al., *Macromolecules* 28:7335-7338 (1995)). On the other hand, when the equilibrium between active and dormant species lies far to the dormant side, the stability, or "livingness," of the propagating active centers can be greatly enhanced due to their low concentration at any given time. Indeed, the enormous success and popularity of controlled/living free radical polymerization for making well-defined block copolymers and other polymer architectures rests on this fact (Matyjaszewski, K., *Macromol. Symp.* 174:51-67 (2001), and references cited therein; Hawker, C. J., *Acc. Chem. Res.* 30:373-382 (1997)). In recent years, a small number of homogeneous transition metal complexes have been reported that can serve as initiators for the living Ziegler-Natta polymerization of α-olefins, and in a few cases, a high degree of stereocontrol during propagation can be achieved, providing either isotactic or syndiotactic polyolefin microstructures (Coates, G. W., et al., *Angew. Chem. Int. Ed.* 41:2236-2257. (2002)). To date, however, reversible deactivation during propagation, and its potential consequences, have not been documented for a living Ziegler-Natta polymerization process.

Although conceptually simple, it is far from given that a process will either provide an active, living polymerization system, or that narrow polydispersities will be obtained. Schrock and coworkers (Mehrkhodavandi, P., et al., *J. Am. Chem. Soc.* 122:7841-7842 (2000)) previously found for their homogeneous Ziegler-Natta system that an excess of neutral dimethyl zirconium precursor relative to the borate cocatalyst produced a dead system, presumably due to an equilibrium that lies far to the right of formation of a cationic methyl-bridged dinuclear complex that is inactive for polymerization. Marks and coworkers (Chen, Y. X., et al., *J. Am. Chem. Soc.* 118:12451-12452 (1996)) further found that, while producing an active, non-living polymerization system, their cationic methyl-bridged dinuclear complex provided broader polydispersities relative to mononuclear cationic initiators, possibly due to slow dissociation and initiation.

BRIEF SUMMARY OF THE INVENTION

The present invention relates to a method of producing a polyolefin composition comprising contacting a metallocene pre-catalyst with a substoichiometric amount of a co-catalyst; adding a first olefin monomer; and polymerizing said first monomer for a time sufficient to form said polyolefin. The method allows for the use of a minimum amount of activating co-catalyst, and allows for the production of stereoregular and non-stereoregular polyolefins. The use of configurationally stable metallocene pre-catalysts allows for the production of monomodal isotactic polyolefins having narrow polydispersity. The use of configurationally unstable metallocene pre-catalysts allows for the production of monomodal atactic polyolefins having narrow polydispersity.

The method of the present invention optionally further comprises contacting said polyolefin with a second amount of said co-catalyst; adding a second olefin monomer; polymerizing said second olefin monomer to form a block-polyolefin composition.

DETAILED DESCRIPTION OF THE INVENTION

"Metallocene" is used here to mean any organometallic coordination complex containing at least one or more B-bonded ligands coordinated with a metal atom from Groups IIIB to VIII or the Lanthanide series of the Periodic Table of the Elements. An example of a B-bonded ligand is the cyclopentadienyl ring. Examples of the metal atoms are the metals of Group IVB such as titanium, zirconium or hafnium.

A stereoregular macromolecule is understood to be a macromolecule that comprises substantially one species of stereorepeating unit. Examples include, but are not limited to, an isotactic macromolecule, a syndiotactic macromolecule, and an atactic macromolecule. A stereoblock macromolecule is understood to be a block macromolecule composed of at least one or more stereoregular, and possibly, non-stereoregular blocks. An example is isotactic-poly (propylene)-block-atactic-poly(propylene).

As used herein, the term "polyolefin" comprises olefin homopolymers, co-polymers and block copolymers.

"Living polymerization" is used herein to mean a polymerization process with substantially no chain-growth stopping reactions, such as chain transfer and chain termination. Preferably, living polymerizations of the present invention are "controlled polymerizations" and allow for control over molecular weights and molecular weight distributions. "Living polymer" is used herein to mean a polymer chain that is able to grow if monomer is available or added. "Dormant species" is used herein to mean an inactive species, for example a polymer chain coordinated to a neutral catalyst. An active species, for example, is a polymer chain coordinated to a non-covalent catalyst (i.e., ion, ion-pair, radical).

Monomodal in molecular weight distribution (MWD) is used herein to mean a composition of polymers that comprise one distinct molecular weight distribution. Typically, the MWD is a range of molecular weights that may range in a number average molecular weight ($M_n$) of about 5 kDa to about 500,000 kDa. The MWD of a polymer can be measured using any method known to one skilled in the relevant art, for example, size exclusion chromatography and gel permeation chromatography (GPC).

"Polydispersity index" is used herein as a measure of the MWD for a given polymer composition. A polydispersity index of one refers to a monodisperse composition. The polydispersity index is a ratio of weight average molecular weight ($M_w$) to number average molecular weight ($M_n$). Preferably, polymer compositions made according the present invention have low polydispersity index, for example, about 1.02-1.1.

Figure 1:
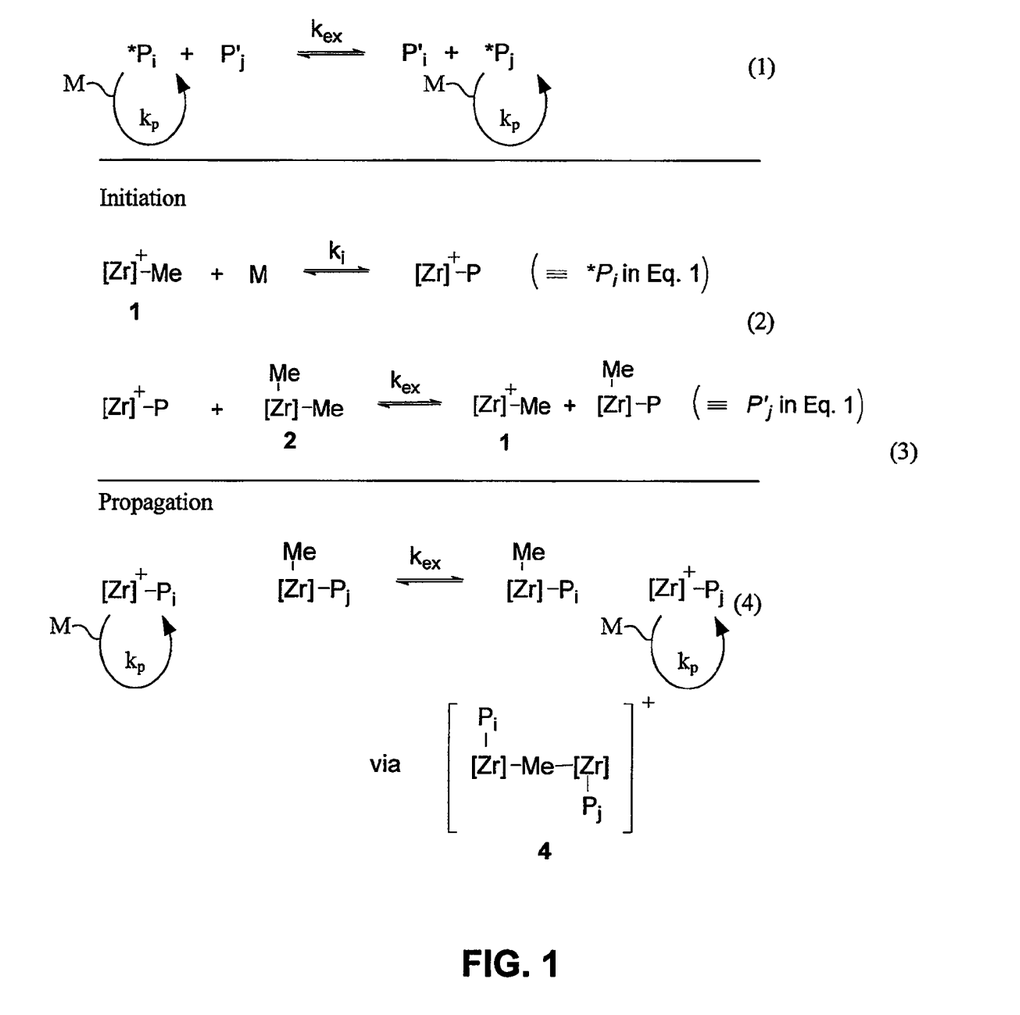
FIG. 1 shows initiation and propagation reaction schemes for the catalyst and polymerization reactions in the methods of the present invention.

The present invention relates to a system that undergoes rapid degenerative transfer between active and dormant species. As shown in FIG. 1, a system that undergoes degenerative transfer can be described according to Equation (1), where P* and P' represent active and dormant polymer chain ends of i and j chain length, respectively. If the rate of transfer is fast compared to the rate of propagation, narrow molecular weight distributions will be obtained. (Müller, A. H. E., et al., *Macromolecules* 28:7335-7338 (1995)).

Switching degenerative transfer "on" or "off" through manipulation of the dormant state (i.e., either present or absent) can affect the stereoregularity, and therefore allow for precise control over resulting tacticity of the polymer. Importantly, this control allows for the preparation of monomodal atactic-isotactic stereoblock polyolefins of narrow polydispersity and tunable block lengths. Stereoblock polyolefins are of significant technological interest, but have not been prepared in such a controlled fashion (Mallin, D. T., et al., *J. Am. Chem. Soc.* 112:2030-2031 (1990); Coates, G. W. and Waymouth, R. M., *Science* 267:217-219 (1995)). Also, using metallocene catalysts that are configurationally stable during degenerative transfer polymerization allows for the preparation stereoregular polyolefins. The degenerative transfer polymerization of the present invention requires only a minimal amount of activating co-catalyst, thus greatly reducing the materials costs of Ziegler-Natta type polyolefin polymerizations. The present findings, therefore, offer new cost-effective methods for preparing materials that will open new opportunities for polyolefin materials engineering.

The present invention relates to the production of stereoregular polyolefins using a substoichiometric amount of activating co-catalyst. The method comprises contacting a metallocene pre-catalyst with a substoichiometric amount of a co-catalyst in a solvent; adding a first olefin monomer; and polymerizing said first monomer for a time sufficient to form a polyolefin.

The present invention also relates to a method of producing a block polyolefin composition. The method comprises contacting a metallocene pre-catalyst with a substoichiometric amount of a co-catalyst in a solvent; adding a first olefin monomer; polymerizing said first monomer for a time sufficient to form a polyolefin; contacting said polyolefin with a second amount of said co-catalyst; adding a second olefin monomer; polymerizing said second olefin monomer to form said block polyolefin composition.

Metallocene catalysts for use in the present invention include any metallocene pre-catalyst that initiates the polymerization of an olefin monomer. Specific examples include, but are not limited to single-site metallocene pre-catalyst such as those disclosed in Hlatky, et al., *J. Am. Chem. Soc.* 111:2728-2729 (1989); K. C. Jayaratne, et al., *J. Am. Chem. Soc.* 122:958-959 (2000); K. C. Jayaratne, et al., *J. Am. Chem. Soc.* 122:10490-10491 (2000); R. J. Keaton, et al., *J. Am. Chem. Soc.* 122:12909-12910 (2000) and R. J. Keaton, et al., *J. Am. Chem. Soc.* 123:6197-6198 (2001).

A preferred metallocene pre-catalyst for use in the present invention has the formula:

wherein the dotted lines indicate a delocalized bond;

M is Ti, Zr, Hf, V, Nb or Ta;

each $R^1$ is independently hydrogen or alkyl or two adjacent $R^1$ form an aromatic ring;

each $R^2$, $R^3$ and $R^4$ is independently alkyl, cycloalkyl, Si(alkyl)$_3$, Si(aryl)$_3$, phenyl, optionally substituted phenyl, alkylphenyl; and each $R^5$ is halo, alkyl, cycloalkyl, aryl, or arylalkyl.

As used herein, "alkyl" refers to straight- or branched-chain hydrocarbons having from 1 to 10 carbon atoms and more preferably 1 to 8 carbon atoms, including by way of example methyl, ethyl, propyl, i-propyl, i-butyl and t-butyl.

"Aryl" by itself or as part of another group refers to monocyclic, bicyclic or tricyclic aromatic groups containing 6 to 14 carbon atoms in the ring position. Useful aryl groups include $C_{6-14}$ aryl, preferably $C_{6-10}$ aryl. Typical $C_{6-14}$ aryl groups include phenyl, naphthyl, indenyl, phenanthrenyl, anthracenyl, fluorenyl and biphenyl groups.

"Arylalkyl" refers to an alkyl group mentioned above substituted by a single aryl group including, by way of example, benzyl, phenethyl and naphthylmethyl.

"Alkylarylalkyl" refers to an alkyl group mentioned above substituted by a single aryl group, wherein the aryl group is further substituted by one or more alkyl groups. Examples include, without limitation, 4-methylbenzyl and 4-ethylphenethyl.

"Cycloalkyl" refers to cyclic alkyl groups containing between 3 and 8 carbon atoms having a single cyclic ring including, by way of example, cyclopropyl, cyclobutyl, cyclopentyl, cyclooctyl and the like.

"Optionally substituted phenyl" refers to a phenyl ring which may contain 1 to 5 electron donating or electron withdrawing groups. By way of example, electron-donating groups include, but are not limited to amino, hydroxy, alkoxy, amide, aryl and alkyl. Examples of electron withdrawing groups include, but are not limited to, halo, ketone, ester, —SO$_3$H, aldehyde, carboxylic acid, cyano, nitro and ammonium.

"Alkphenyl" refers to an alkyl group mentioned above substituted by a single phenyl group including, by way of example, benzyl, 1-phenethyl, 1-phenylpropyl, 1-phenylbutyl, 2-phenethyl, 2-phenylpropyl, 2-phenylbutyl, 3-phenylpropyl and 3-phenylbutyl.

"Halo" refers to fluoro, chloro, bromo and iodo.

"Aromatic ring" refers to an unsaturated carbocyclic group of 6 to 14 carbon atoms having a single ring (e.g., phenyl) or multiple condensed rings (e.g., naphthyl or anthryl). The metallocene catalysts of the present invention can be prepared using any suitable method known to one skilled in the relevant art. The method of synthesis of the metallocene catalysts is not critical to the invention.

Specific examples of metallocene catalysts for use in the present invention include 1,2,3,4,5-pentamethylcyclopentadienyl dimethyl zirconium (N-ethyl-N-$^t$butyl-2-methyl) amidinate and 1,2,3,4,5-pentamethylcyclo-pentadienyl chloro isobutyl zirconium (N-ethyl-N-$^t$butyl-2-methyl) amidinate.

Another example of metallocene catalysts for use in the present invention includes metallocene catalysts having the formula:

wherein each R$^1$ is independently hydrogen or alkyl or two adjacent R$^1$ form an aromatic ring;
each R$^2$, R$^3$ and R$^4$ is independently alkyl, cycloalkyl, Si(alkyl)$_3$, Si(aryl)$_3$, phenyl, optionally substituted phenyl, or alkylphenyl; and
R$^5$ is halo, alkyl, cycloalkyl, aryl or arylalkyl.

Another specific example of metallocene catalysts for use in the present invention includes 1,2,3,4,5-pentamethylcyclopentadienyl n-pentyl tantalum eneamidate having the formula:

The co-catalyst is capable of activating the metallocene pre-catalyst. Preferably, the co-catalyst is one of the following: (a) ionic salts of the general formula [A$^+$][$^-$BR$^6_4$], wherein A$^+$ is Si(R$^7$)$_3$, a cationic Lewis acid or a cationic Brønsted acid, B is the element boron, R$^6$ is phenyl or an optionally substituted phenyl or (b) a boron alkyl of the general formula BR$^6_3$ and each R$^7$ is independently selected from alkyl and optionally substituted phenyl. Examples of Lewis or Brønsted acids that may be used in the practice of the invention include, but are not limited to tetra-n-butylammonium, triphenylcarbonium and dimethylanilinium cations. Specific examples of preferred co-catalysts include [PhNMe$_2$H][B(C$_6$F$_5$)$_4$] and Si(CH$_2$CH$_3$)$_3$[B(C$_6$F$_5$)$_4$].

The method of the present invention comprises contacting a metallocene pre-catalyst with a substoichiometric amount of a co-catalyst to form a first catalyst composition in a first activation reaction. Substoichiometric amount is used herein to mean an amount less than about an equivalent amount. For example, the metallocene pre-catalyst and co-catalyst can be added together in a ratio of metallocene pre-catalyst:co-catalyst in the range of about 1:1 to about 100:1. In an alternative example, the ratio is about 1.2:1, 1.5:1, 1.8:1, 2:1, 2.2:1, 2.5:1, 3:1, 4:1, 5:1, 10:1, 25:1, 50:1, 75:1 or 90:1. In an alternative example, the co-catalyst is added in an amount of about 1-5 mole % of the metallocene pre-catalyst.

The pre-catalyst and co-catalyst can be contacted neat, or in some suitable solvent. Suitable solvents for use in the present invention include inert liquid hydrocarbons that are nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose include, but are not limited to chlorobenzene, dichlorobenzene, isopentane, hexane, cyclohexane, heptane, benzene, toluene, trifluorotoluene, pentane, octane, isooctane, dichloromethane.

The pre-catalyst and co-catalyst can be contacted at any temperature, preferably, the temperature results in the formation of an active catalyst composition for olefin polymerizations. For example, the temperature of the activation reaction is from about –50° C. to about 20° C., preferably from about –20° C. to about 10° C.

The pre-catalyst and co-catalyst can be contacted for any length of time, as long as the activation reaction results in an active catalyst composition for olefin polymerizations. For example, the activation reaction can be performed for a time of about 1 minute to about 50 hours, preferably about 30 minutes to about 5 hours. Alternatively, monomer may be added immediately following the contacting of the metallocene pre-catalyst and borate co-catalyst.

Upon formation of the first catalyst composition, the method of the present invention further comprises adding a first olefin monomer to the catalyst composition. The first catalyst composition is contacted with the first monomer for a time sufficient to form a polyolefin.

Olefin monomers for use in the invention include, but are not limited to ethene, propene, 1-butene, 1-pentene, 1-hexene, 1-heptene, 1-octene, styrene, alpha-methyl styrene, butadiene, isoprene, acrylonitrile, methyl acrylate, methyl methacrylate, vinyl acetate, vinyl chloride, vinyl fluoride, vinylidene chloride, N-vinyl pyrrolidone, 3-methylbutene, 3-methyl-1-pentene, vinylcyclohexane, vinylcyclobutane, vinylcyclopentane, vinylcyclooctane, 1-decene, enantiomerically pure β-citronellene, 3,5,5-trimethyl-1-hexene or 4-methyl-1-pentene. Olefin monomers for use also include conjugated or non-conjugated dienes, such as linear, branched, or cyclic hydrocarbon dienes having from about 4 to about 20, preferably 4 to 12, carbon atoms, including those dienes having the formula:

wherein X=$CH_2$, CO, N($R^{13}$), O or S;
$R^{11}$, $R^{12}$ and $R^{13}$ are each independently H, alkyl or phenyl; and
n and m are each independently an integer from 0-5.

Preferred dienes include 1,4-pentadiene, 1,5-hexadiene, 5-vinyl-2-norbornene, 1,7-octadiene, vinylcyclohexene, dicyclopentadiene, butadiene, isobutylene, isoprene and ethylidene norbornene.

The time required for forming the polyolefin varies depending on the olefin monomer, temperature of reaction, reactant cocentrations, and other conditions, and can be for any length of time, as long as a polymer is formed. For example, the polymerization of the first olefin can be performed for a time of about 1 minute to about 50 hours, preferably about 30 minutes to about 5 hours.

The molar ratio of metallocene pre-catalyst to added first olefin monomer determines the molecular weight of the first polymer and can be any ratio used to produce a first polyolefin having molecular weight about 5 kDa—about 500,000 kDa. For example, the metallocene precatalyst and first olefin monomer are added in a metallocene catalyst:first monomer ratio of about 1:10-1:10,000. In an alternative example, the ratio is 1:20, 1:50, 1:100, 1:250, 1:500, 1:750, 1:1,000, 1:2,500, 1:5,000 or 1:7,500.

The choice of metallocene pre-catalyst controls the stereoregularity of the polyolefin produced by degenerative transfer polymerization (DTP). When DTP is carried out using a configurationally unstable metallocene catalyst, (i.e. a catalyst with metal-centered epimerization rates of the dormant state greater than the exchange and propagation rates), the polyolefin produced has low isotacticity and is preferably an atactic polyolefin. "Atactic" is used herein to mean a regular polyolefin, the molecules of which have approximately equal numbers of the possible configurational base units in a random sequence distribution. An example of configurationally unstable catalysts for use in the present invention include, but is not limited to 1,2,3,4,5-pentamethylcyclopentadienyl dimethyl zirconium (N-ethyl-N-$^t$butyl-2-methyl)amidinate.

When DTP is carried out using a configurationally stable metallocene catalyst, (i.e. a catalyst with metal-centered epimerization rates of the dormant state less than the exchange and propagation rates), the polyolefin produced has high isotacticity and is preferably an isotactic polyolefin. An example of configurationally stable catalysts for use in the present invention include, but is not limited to 1,2,3,4,5-pentamethylcyclopentadienyl chloro isobutyl zirconium (N-ethyl-N-$^t$butyl-2-methyl)amidinate. "Isotactic" is used herein to mean a regular polyolefin (or polyolefin block), the molecules of which can be described in terms of only one species of configurational base unit (having chiral or prochiral atoms in the main chain) in a single sequential arrangement. High isotacticity can be measured using any method known to one skilled in the relevant art, for example, $^1$H or $^{13}$C Nuclear Magnetic Resonance (NMR) spectroscopy is used. Using the pentad level of analysis, isotactic polyolefin blocks of the present invention have pentad levels from about 90 to 100 percent, preferably from about 97 to 100 percent. See Asakura et al., *Macromolecules* 24:2334-2340 (1991).

In one example, the method of the present invention further comprises isolating the resulting polyolefin. In an alternative example, after polymerizing the first monomer for a time sufficient to form a polyolefin, the method of the present invention optionally further comprises contacting the polyolefin with a second amount of the co-catalyst in a second activation reaction. The second amount of co-catalyst can be added in any amount, preferably, an amount sufficient to produce a catalyst composition capable of forming an isotactic polyolefin. For example, the co-catalyst may be added in a second amount about equal to a stoichiometric amount of said metallocene pre-catalyst. In an alternative example, the second amount is a metallocene pre-catalyst:co-catalyst ratio in the range of about 0.5:1-2:1. In an alternative example, the second amount is a metallocene pre-catalyst:co-catalyst ratio of about 0.6:1, 0.8:1, 1:1, 1.2:1, 1.4:1, 1.6:1 or 1.8:1.

The second co-catalyst is contacted with the polyolefin composition for any length of time, preferably, a time sufficient to produce a catalyst composition capable of forming an isotactic polyolefin. For example, the second activation reaction can be performed for a time of about 1 minute to about 50 hours, preferably about 30 minutes to about 5 hours. Alternatively, the second olefin monomer is added immediately following the contacting of the metallocene pre-catalyst and second amount of borate co-catlyst.

The second olefin monomer can be any polymerizable olefin or diene. In one example, the first olefin is 1-hexene and the second olefin monomer is 1-octene. In an alternative example, the first and second olefin monomers are the same, resulting in an atactic-block-isotactic-homopolymer. The molecular weight of the block-polymerized second olefin depends on the concentration of the second olefin monomer. For example, the metallocene precatalyst and second olefin monomer are added in a metallocene catalyst:second monomer ratio of about 1:10-1:10,000. In an alternative example, the ratio is 1:20, 1:50, 1:100, 1:250, 1:500, 1:750, 1:1,000, 1:2,500, 1:5,000 or 1:7,500. In another example, the concentration of the second olefin monomer is such that the resulting second polyolefin block has the same molecular weight as the first polyolefin block.

Upon addition of the second olefin monomer, the method of the present invention further comprises polymerizing the second olefin monomer to form a block polyolefin composition. The polymerization of the second olefin can be performed for a time of about 1 minute to about 50 hours, preferably about 30 minutes to about 5 hours. The second polyolefin block produced has high isotacticity and is preferably an isotactic polyolefin.

In a specific example, the cationic zirconium acetamidinate, [Cp*ZrMe{N(Et)C(Me)-N($^t$Bu)}][B(C$_6$F$_5$)$_4$] (CP*=$\eta^5$-C$_5$Me$_5$) (1), prepared through demethylation of neutral Cp*ZrMe$_2$[N(Et)C(Me)N($^t$Bu)] (2) with [PhNMe$_2$H][B(C$_6$F$_5$)$_4$] (3), can serve as a highly active initiator for the isospecific polymerization of α-olefins (Jayaratne, K. C. and Sita, L. R., *J. Am. Chem. Soc.* 122:958-959 (2000); Jayaratne, K. C., et al., *J. Am. Chem. Soc.* 122:10490-10491 (2000); Keaton, R. J., et al., *J. Am. Chem. Soc.* 122:12909-12910 (2000); Jayaratne, K. C. and Sita, L. R., *J. Am. Chem. Soc.* 123:10754-10755 (2001)). Complex 1 exists in the solid state as a dicationic dimer with bridging methyl groups (Keaton, R. J., et al., *J. Am. Chem. Soc.* 122:12909-12910 (2000)), and that, in solution, rapid methyl-polymeryl group exchange can occur between a polymer derived from 1 and either 1 itself, or structurally related cationic initiators (Jayaratne, K. C. and Sita, L. R., *J. Am. Chem. Soc.* 123:10754-10755 (2001)).

Contacting pre-catalyst 2 with co-catalyst 3 forms a first catalyst composition comprising 1. As shown in FIG. 1, upon addition of the olefin monomer (M), the catalyst composition undergoes olefin insertion to produce an active propagating center (i.e., P$_i$* in Equation (2)) that can either undergo further insertions, or can engage in methyl group exchange with 2 to generate additional 1 at the expense of producing a dormant chain (i.e., P$_j$' in Equation (3)). Preferably, k$_i$, k$_{ex}$>>k$_p$, and living propagation via degenerative transfer occurs according to Equation (4). In this case, a narrow polydispersity is expected for fast exchange between the active and dormant chain ends through intermediacy of the monocationic methyl-bridged dinuclear species 4, shown in FIG. 1.

Methyl group exchange between two cationic zirconium centers can be facile. As shown in FIG. 1, reversible deactivation by degenerative transfer, can be based on methyl group exchange between an active propagating chain and a dormant neutral chain according to Equations (2)-(4). More specifically, Equations (2) and (3) represent initiation steps when substoichiometric amounts of the borate 3 are used to demethylate metallocene pre-catalyst 2 to generate cationic polymerization catalyst 1. In the absence of monomer, variable temperature (VT) $^1$H NMR (400 MHz, chlorobenzene-d$_5$) studies show that mixtures of 1 and 2, in any ratio, are engaged in rapid methyl group exchange through a process that most likely involves a monocationic methyl-bridged dinuclear complex. These VT $^1$H NMR spectra reveal only a single set of exchange averaged resonances down to the temperature limit of the solvent (~-40° C.); Bochmann, M. and Lancaster, S. J., *Angew. Chem. Int. Ed.* 33:1634-1637 (1994); Chen, Y. X., et al., *J. Am. Chem. Soc.* 118:12451-12452 (1996); Jia, L., et al., *Organometallics* 16:842-857 (1997); Mehrkhodavandi, P., et al., *J. Am. Chem. Soc.* 122:7841-7842 (2000); Vollmerhaus, R., et al., *Organometallics* 19:2161-2169 (2000).

Active mononuclear cationic metallocene catalyst centers are species susceptible to termination via reaction with solvent and β-hydride elimination (dialkyl monocyclopentadienyl zirconium acetamidinates bearing β-hydrogens have been shown to be remarkably resistant to β-hydride elimination) (Keaton, R. J., et al., *J. Am. Chem. Soc.* 124:5932-5933 (2002)). In a preferred embodiment, therefore, the concentration of active mononuclear cationic centers is kept low due, not only to stoichiometry (i.e., [2]/[3]=[P']/[P*] greater than about 1), but also due to the fact that 4 can be the resting state of the system.

Figure 2:
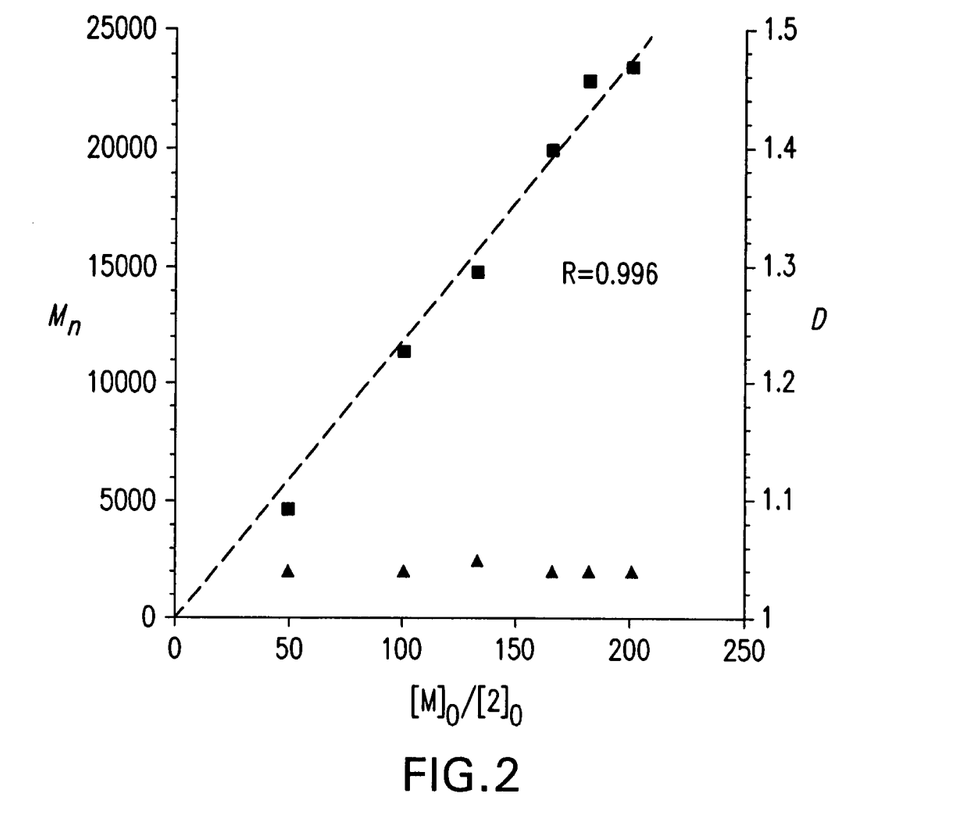
FIG. 2 shows dependence of poly(1-hexene) $M_n$ (●) and polydispersity index (♦) values on $[M]_o/[2]$ ratios at constant monomer and co-catalyst concentrations.

As shown in FIG. 2, the reaction scheme predicts that the average number degree of polymerization (X$_n$) will be determined by the ratio [M]$_o$/[2] ([M]$_o$=initial monomer concentration), not by [M]$_o$/[1]. Polymerizations of the present invention have critical rate and equilibrium constants that are of the proper magnitude for degenerative transfer living Ziegler-Natta polymerization. Specifically, FIG. 2 shows dependence of poly(1-hexene) M$_n$ (●) and Polydispersity index (PDI) (♦) values on [M]$_o$/[2] ratios for [M]$_o$=0.50 M and [3]=2.5 mM. The number average molecular weight value, M$_n$, of poly(1-hexene) was inversely proportional in a linear fashion to initial [2] (keeping both [M]$_o$ and [3] constant) and for each [M]$_o$/[2] ratio, a PDI less than about 1.05 was obtained. Polymerizations were conducted in chlorobenzene at about −10° C. by addition of 1-hexene to a preformed solution (within 5 min after mixing) of 2 and 3. M$_o$ and PDI values were obtained by GPC analysis and were calculated relative to polystyrene standards.

Demonstration of degenerative transfer living Ziegler-Natta polymerization using metallocene pre-catalyst 2 and co-catalyst 3 becomes of potential technological value upon examination of the polymer microstructures that are obtained from the process. As stated, polymerization of 1-hexene using catalyst 1 is isospecific with ratios of [2]/[3] about equal to one. Whereas with ratios of [2]/[3] greater than about 1, loss of stereocontrol during propagation is observed. The barrier to racemization/epimerization via amidinate 'ring-flipping' in monocyclopentadienyl zirconium acetamidinates is highly sensitive to the electron-deficiency of the metal center. Neutral metallocene pre-catalyst 2 undergoes facile racemization (Jayaratne, K. C. and Sita, L. R., *J. Am. Chem. Soc.* 122:958-959 (2000)). Cationic catalyst compositions comprising 1, however, and living polymers coordinated to these catalyst compositions are configurationally stable for extended periods of time in solution (Jayaratne, K. C. and Sita, L. R., *J. Am. Chem. Soc.* 123:10754-10755 (2001)). Methyl-bridged species 4, shown in FIG. 1, being less electron-deficient than cationic catalyst compositions comprising 1, undergoes metal-centered epimerization that is, at least, competitive with propagation.

Thus, the method of the present invention, can be used to directly produce atactic-isotactic stereoblock copolymers through degenerative transfer. Preferably, the method of the present invention is used to simply turn "on" or "off" degenerative transfer after each successive monomer addition and polymerization by changing ratios of [2]:[3] between greater than about 1 (on-state) and about equal to 1 (off-state). The 'on' state produces atactic polyolefin, while the 'off' state produces isotactic polyolefin.

Figure 4:
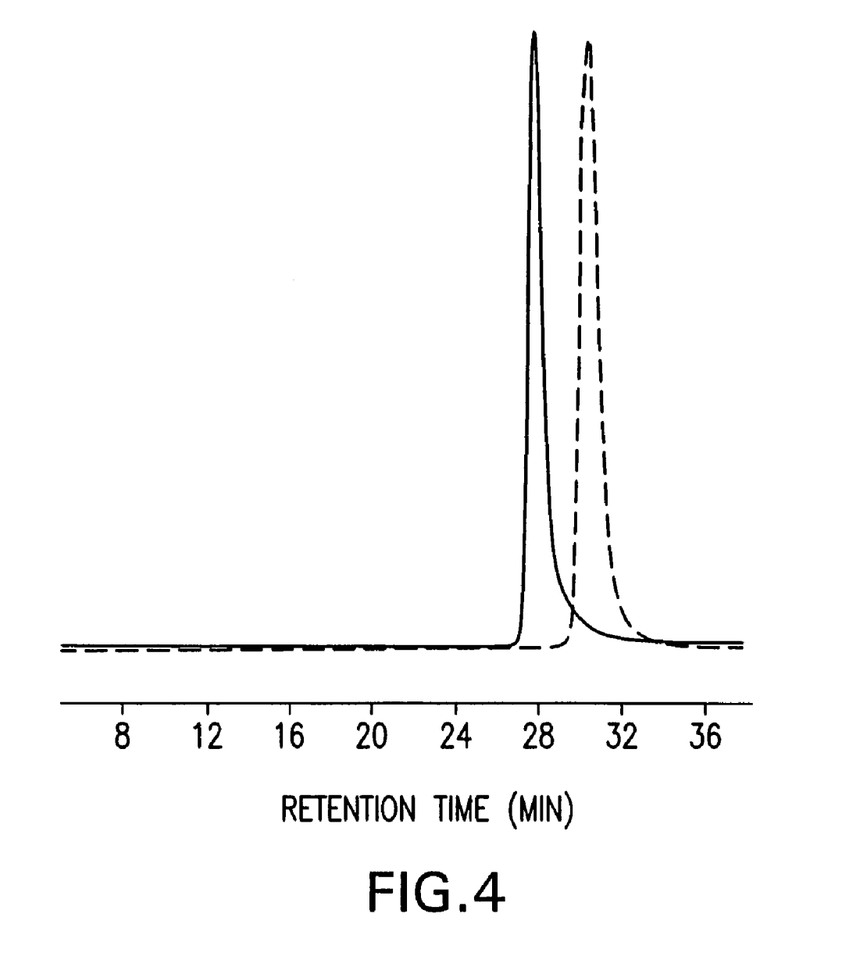
FIG. 4 shows a GPC trace of atactic-poly(1-hexene)-b-isotactic-poly(1-octene) (solid trace) and atactic poly(1-hexene) (dashed line).

As a proof-of-concept, 100 equivalents of 1-hexene was first polymerized at −10° C. under standard conditions using about a 2:1 ratio of [2]/[3] (on-state) to produce a living atactic poly(1-hexene) block (X$_{calc}$=50). Addition of 1 equivalent of 3 then served to selectively demethylate the remaining methyl groups of the dormant chains (Chemoselective demethylation has been observed for a series of Cp*ZrMeR[N(Et)C(Me)N($^t$Bu)] derivatives), after which time, 100 equivalents of 1-octene was added to produce an isotactic poly(1-octene) block (X$_{calc}$=50). FIG. 4 shows, after isolation and purification of the atactic-poly(1-g(1-hexene)-b-isotactic-poly(1-octene) stereoblock polymer, GPC revealed a monomodal molecular weight distribution with M$_n$=12,400 (cf. M$_{n(calc)}$=9,800) and PDI=1.04.

Figure 5:
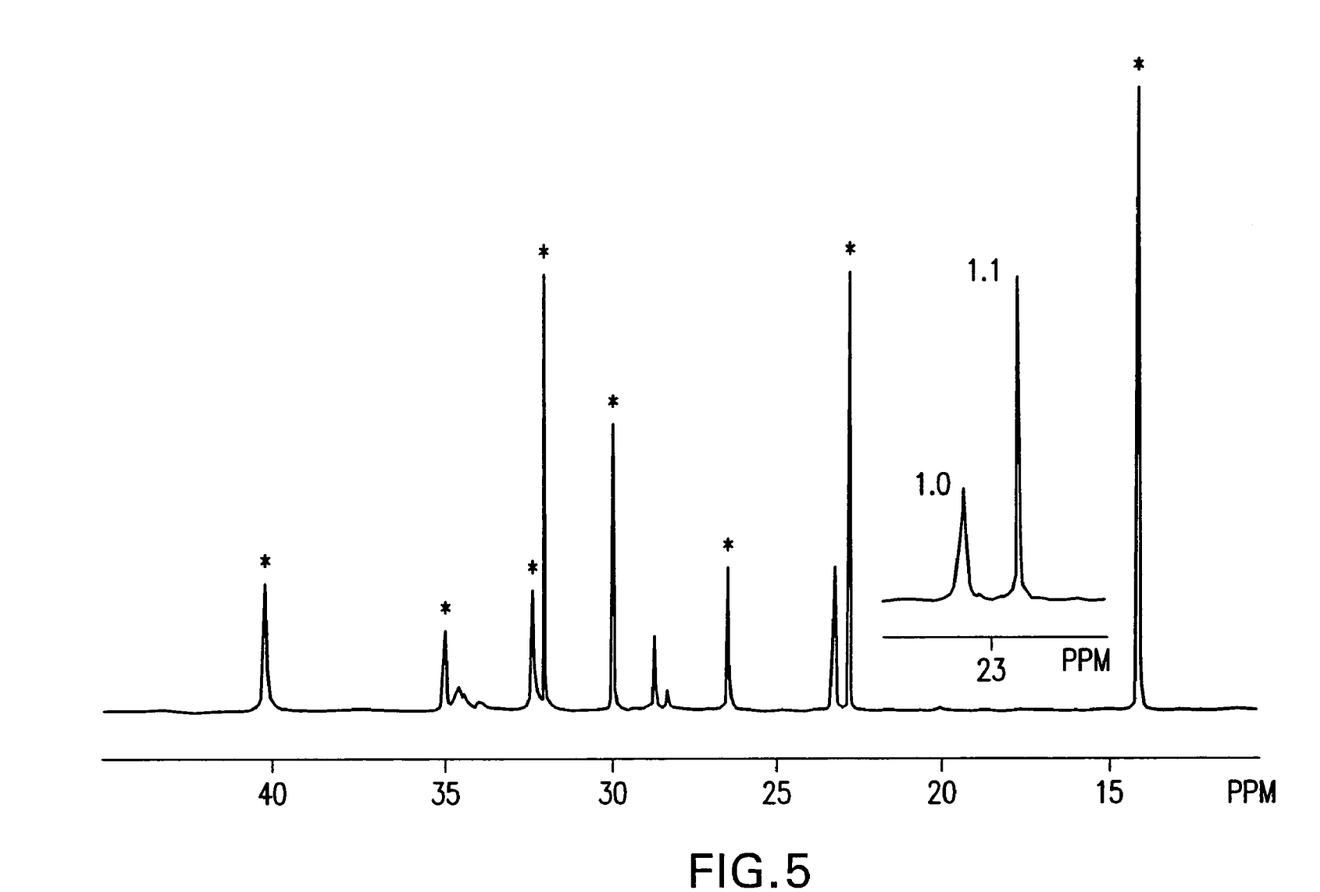
FIG. 5 shows a $^{13}$C-NMR spectrum for atactic-poly(1-hexene)-b-isotactic-poly(1-octene).

FIG. 5 shows an inverse-gated $^{13}$C($^1$H) NMR (100 MHz, CDCl$_3$, 25° C. spectrum confirming the expected stereochemical microstructures, and it showing about 1:1 integrated ratio of the two polyolefin blocks, confirming that the blocks were identical in length as designed. In the present case, two different α-olefins were used to aid in structure verification of this proof-of concept. In another aspect of the invention, the process is used for the controlled synthesis of homopolymer atactic-isotactic stereoblock materials that are expected to possess properties of technological interest Having now generally described this invention, the same will be understood by reference to the following examples which are provided herein for purposes of illustration only and are not intended to be limiting unless otherwise specified.

EXAMPLES

Example 1

Preparation of Cp*ZrCl(i-Bu)[N(t-Bu)C(Me)N(Et)] (7): To a solution of 2.62 g (6.0 mmol) of 6 in 200 ml of $Et_2O$ at −78° C. was added 2.8 ml (6.1 mmol) of a 2.21 M solution of i-BuMgCl in $Et_2O$. After slowly warming to room temperature, the reaction mixture was stirred for an additional hour before quenching with excess chlorotrimethylsilane, after which time, the volatiles were removed in vacuo. The crude product was extracted with toluene and the extracts filtered through a pad of Celite to provide a clear yellow solution, which upon concentration and cooling −35° C., afforded yellow crystals of 7 (2.55 g, 93% yield).

$^1$H NMR: (400 MHz, benzene-$d_6$, 25° C.), δ 2.81 (dq, $^2J$=14.3 Hz, $^3J$=7.2 Hz, 1H), 2.67 (dq, $^2J$=14.3 Hz, $^3J$=7.2 Hz, 1H), 2.20 (nonet, $^3J$=6.4 Hz, 1H), 2.00 (s, 15H), 1.71 (s, 3H), 1.33 (s, 9H), 1.32 (d, $^3J$=6.4 Hz, 3H), 1.15 (d., $^3J$=6.4 Hz, 3H), 0.83 (t, $^3J$=7.2 Hz, 3H), 0.73 (dd, $^2J$=13.5 Hz, $^3J$=6.4 Hz, 1H), 0.01 (dd, $^2J$=13.5 Hz, $^3J$=6.4 Hz, 1H). $^{13}$C {$^1$H} NMR: δ173.7, 122.1, 77.9, 54.0, 43.2, 32.1, 30.9, 29.0, 27.9, 18.3, 15.9, 12.6. Anal. Calcd. for $C_{22}H_{41}ClN_2Zr$: % C, 57.40; % H, 9.00; % N, 6.09; Found: % C, 57.36; % H, 8.90; % N 5.89.

Example 2

Preparation of Cp*ZrMe(i-Bu)[N(t-Bu)C(Me)N(Et)] (5): To a solution of 0.55 g (1.2 mmol) of 7 in 40 ml of $Et_2O$ at −78° C. was added 0.9 ml (1.2 mmol) of 1.38 M MeLi in $Et_2O$. After slowly warming to room temperature, the reaction mixture was stirred for an additional hour before quenching with excess chlorotrimethylsilane, after which time the volatiles were removed in vacuo. The crude product was extracted with pentane and the extracts filtered through a thin pad of Celite to provide a clear yellow solution, which upon concentration and cooling to −35° C., afforded yellow crystals of 5 (0.37 g, 71% yield).

1H NMR: (400 MHz, benzene-$d_6$, 25° C., δ 2.97 (dq, $^2J$=14.3 Hz, $^3J$=7.2 Hz, 1H), 2.75 (dq, $^2J$=14.3 Hz, $^3J$=7.2 Hz, 1H), 2.20 (m, 1H) 1.98 (s, 15H), 1.80 (s, 3H), 1.27 (d, $^3J$=6.4 Hz, 3H), 1.20 (d $^3J$=6.4 Hz, 3H), 1.19 (s, 9H), 0.88 (t, $^3J$=7.2 Hz, 3H), 0.41 (dd, $^2J$=13.1 Hz, $^3J$=6.4 Hz, 1H), 0.23 (s, 3H), −0.25 (dd, $^2J$=13.1 Hz, $^3J$=6.4 Hz, 1H). Anal. Calcd. for $C_{23}H_{44}N_2Zr$: % C, 62.80; % H, 10.08; % N, 6.36; Found: % C, 62.31; % H, 10.10; % N 6.15.

Example 3

Preparation of [Cp*Zr(i-Bu){N(t-Bu)C(Me)N(Et)}][B($C_6F_5$)$_4$] (8): To 31 mg (3.9 μmol) of 3 was added, at −10° C., a precooled solution of 17 mg (3.7 μmol) of 5 in 0.9 ml of $C_6D_5Cl$ to provide a yellow solution.

$^1$H NMR: (500 MHz, −10° C.) δ 3.05 (dq, $^2J$=13.2 Hz, $^3J$=6.8 Hz, 1H), 3.04 (dq, $^2J$=13.2 Hz, $^3J$=6.8 Hz, 1H), 1.99 (s, 3H), 1.87 (s, 15H), 1.61 (dd, $^2J$=12.2 Hz, $^3J$=3.7 Hz, 1H), 1.16 (d, $^3J$=5.5, 3H), 1.02 (s, 9H), 0.98 (d, $^3J$=5.5 Hz, 3H), 0.91 (t, $^3J$=6.8 Hz, 3H), 0.77 (dd, $^2J$=12.2 Hz, $^3J$=7.2 Hz, 1H), −0.25 (M, 1H).

Example 4

Figure 3:
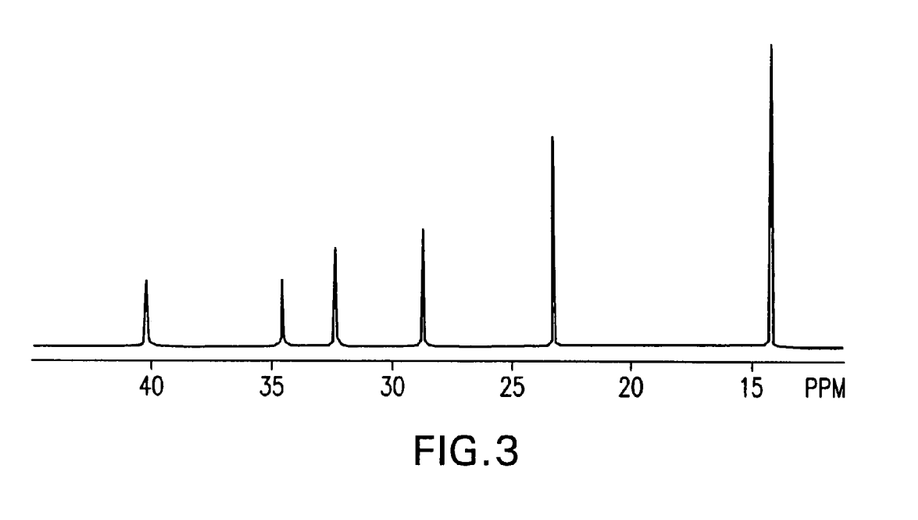
FIG. 3 shows a $^{13}$C-NMR spectrum for isotactic-poly(1-hexene) prepared in accordance with the methods of the present invention.

General procedure for polymerization of 1-hexene: The entire procedure was conducted at −10° C. with magnetic stirring within a low temperature refrigerator housed within a glove box and all reagents and solutions were precooled to this temperature prior to being used. To a solution of about 40 mg (50 μmol) of 3 in about 12 ml of chlorobenzene was added a solution of about 20 mg (50 μmol) of 2 in about 8 ml of chlorobenzene to produce a yellow solution. At this time about 842 mg (10 mmol) of 1-hexene was added all at once and the resulting mixture allowed to stir for about 2 hrs after which time, it was rapidly quenched by the addition of acidic methanol. The volatiles were then removed in vacuo, and the crude polymeric material was purified through precipitation of a toluene solution into a large volume of acidic methanol. The final pure poly(1-hexene) was collected and dried overnight at 60° C. (0.01 mmHg). FIG. 3 shows $^{13}$C {$^1$H} NMR (100 MHz, chloroform-$d_1$, 25° C.) spectra of the poly(1-hexene).

For degenerative transfer studies, polymerizations of 1-hexene using other cocatalyst/catalyst ratios were conducted in an identical manner by varying only the amount of 2 that was used. This general procedure was also used to determine the efficacy of 8 as an initiator for the isospecific living polymerization of 1-hexene.

Example 5

Synthesis of atactic-poly(1-hexene)-b-isotactic-poly(1-octene): The entire procedure was conducted at −10° C. with magnetic stirring within a low temperature refrigerator housed within a glove box and all reagents and solutions were precooled to this temperature prior to being used. Using the standard polymerization procedure from Example 4, about 420 mg (5 mmol) of 1-hexene was polymerized using a [3]/[2] ratio of about 0.5. After about 2 h, an aliquot was removed for NMR and GPC analysis. Also at this time, an additional about 40 mg (50 μmol) of 3 was added, the reaction mixture allowed to gestate for about 5 min, and then about 560 mg (5 mmol) of 1-octene was added all at once. After stirring about another 3 h, the reaction was rapidly quenched by the addition of acidic methanol. The volatiles were then removed in vacuo, and the crude material was purified through precipitation of a toluene solution into a large volume of acidic methanol. The final pure polymer was collected and dried overnight at about 60° C. (0.01 mmHg). Yield of final stereoblock polymer: 0.87 g (88%).

FIG. 4 shows GPC analysis of atactic-poly(1-hexene)-b-isotactic-poly(1-octene) (solid trace) and an aliquot of the atactic poly(1-hexene) block formed before addition of the 1-octene monomer (dashed line). Polydispersity index, D, is about 1.04 for both polymers. FIG. 5 shows $^{13}$C {$^1$H} NMR (100 MHz, chloroform-$d_1$, 25° C.) spectra of atactic-poly(1- hexene)-b-isotactic-poly(1-octene). $^{13}$C NMR resonances for the isotactic poly(1-octene) block are marked with an asterisk (*).

Example 6

Figure 6:
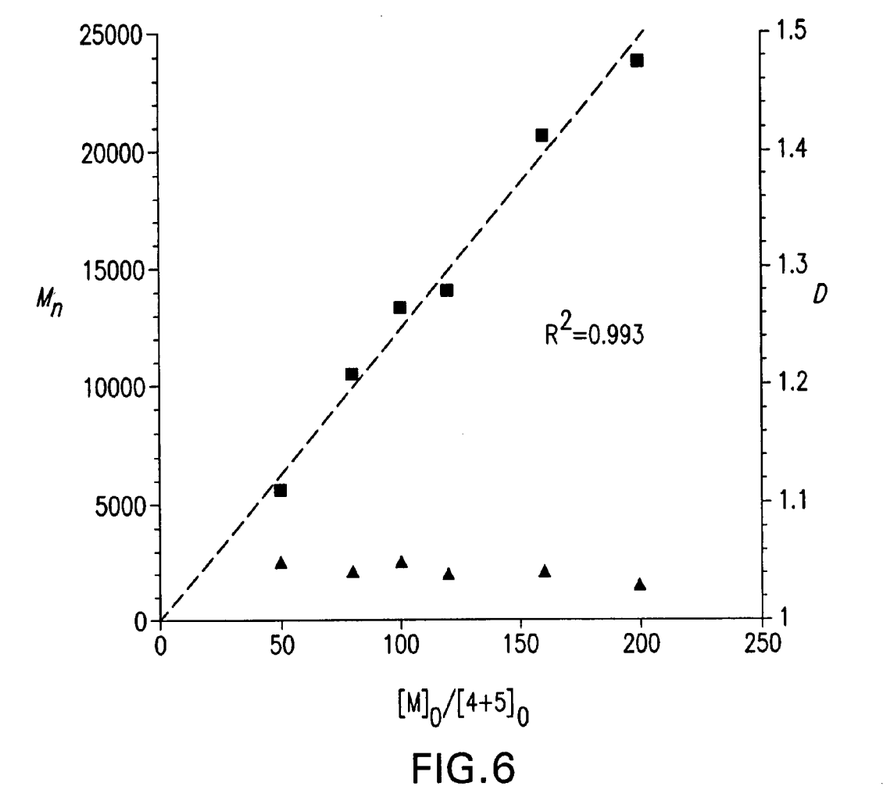
FIG. 6 shows dependence of poly(1-hexene) $M_n$ (■) and D (▲) values on $[M]_o/[1+7]_o$ at constant $[M]_o=0.50$ M and $[1]_o=25$ μM. $M_n$ and D values were obtained by GPC and are reported relative to polystyrene standards.
Figure 7:
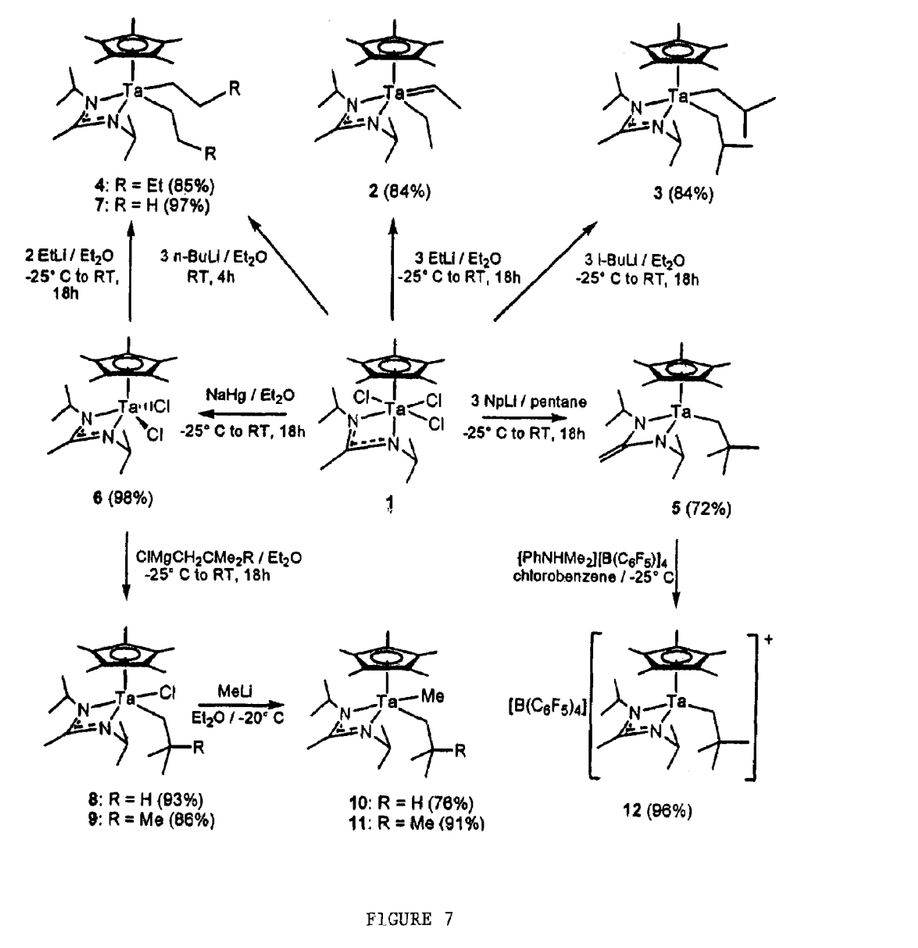
FIG. 7 shows methods for preparing metallocene catalysts for use in the present invention.

Mixtures of metallocene catalysts 1 and 7 (prepared according to Example 1) were used to polymerize 1-hexene. Polymerization reaction were conducted under conditions similar to Example 4. FIG. 6 shows dependence of resulting poly(1-hexene) $M_n$ (■) and D (▲) values on $[M]_o/[1+7]_o$ at constant $[M]_o$=0.50 M and $[1]_o$=25 μM. $M_n$ and D values were obtained by GPC and are reported relative to polystyrene standards. In the absence of 7, polymerization of 200 equivalents of 1-hexene using 1 provided isotactic poly(1-hexene) with $M_n$ about 24,000 and D of about 1.04. By keeping $[1]_o$ constant, preformed mixtures of 1 and 7 were found to polymerize the same amount of 1-hexene within approximately the same period of time to produce isotactic poly(1-hexene) possessing $M_n$ values that were linearly proportional to the ratio of the initial monomer concentration to the total concentration of 1 and 7 (i.e. $[M]_o/[1+7]_o$ or $[M]_o/[Zr]_{total}$). These results confirm the presence of living polymerization via chloride degenerative transfer according to the reactions shown in FIG. 1. The polydispersity index for each poly(1-hexene) sample is less than about 1.05, establishing that both active and dormant chain ends formally propagate at the same rate, confirming that the exchange rate is greater than the propagation rates.

$^{13}$C{$^{1}$H} NMR spectra confirmed that each poly(1-hexene) sample possessed a strictly isotactic polymer microstructure, confirming that all species involved in the chloride degenerative transfer polymerization process are configurationally stable on the time scale of the polymerization reaction.

Example 7

Synthesis of isotactic-poly(1-hexene) via chloride degenerative transfer. To test the viability of using chloride degenerative transfer to dramatically reduce the required amount of cocatalyst, a polymerization of about 100 equivalents of 1-hexene was conducted using about 5 mole % of $Si(CH_2CH_3)_3[B(C_6F_5)_4]$ to activate 1,2,3,4,5-pentamethyl-cyclopentadienyl chloro isobutyl zirconium (N-ethyl-N-$^t$butyl-2-methyl)amidinate. The polymerization was carried out under conditions similar to those of Example 4. The resulting isotactic-poly(1-hexene) obtained had narrow polydisperisty (D=1.03) and $M_n$ of about 8,700. The molecular weight is close to the theoretical value for chloride degenerative transfer being operative (calculated $M_n$ of about 168,000 in the absence of chloride degenerative transfer).

From the foregoing description, one skilled in the art can easily ascertain the essential characteristics of this invention, and without departing from the spirit and scope thereof, can make various changes and modifications of the invention to adapt it to various usages and conditions without undue experimentation. All patents, patent applications and publications cited herein are incorporated by reference in their entirety.

What is claimed is:
1. A method of producing a polyolefin composition comprising contacting a metallocene pre-catalyst with a substoichiometric amount of a co-catalyst; adding a first olefin monomer; and polymerizing by degenerative transfer polymerization said first monomer for a time sufficient to form said polyolefin, wherein said metallocene pre-catalyst has the formula:

wherein the dotted lines indicate a delocalized bond;
M is V, Nb or Ta;
each $R^1$ is independently hydrogen or alkyl or two adjacent $R^1$ form an aromatic ring;
each $R^2$, $R^3$ and $R^4$ is independently alkyl, cycloalkyl, Si(alkyl)$_3$, Si(aryl)$_3$, phenyl, optionally substituted phenyl, or alkylphenyl; and
each $R^5$ is halo, alkyl, cycloalkyl, aryl or arylalkyl.

2. The method of claim 1, wherein:
said optional substituents on phenyl are amino, hydroxy, alkoxy, amide, aryl, alkyl, halo, ketone, ester, —SO$_3$H, aldehyde, carboxylic acid, cyano, nitro and ammonium.

3. The method of claim 1, wherein said co-catalyst has one of the formulae:

$$[A]^+[BR^6_4]^\ominus \text{ or } BR^6_3$$

wherein $A^+$ is $Si(R^7)_3$, a cationic Lewis acid or a cationic Brønsted acid;
B is the element boron;
$R^6$ is phenyl or a phenyl optionally substituted by alkoxy, amide, aryl, alkyl, halo, ketone, ester, —SO$_3$H, aldehyde, carboxylic acid, cyano, nitro and ammonium;
each $R^7$ is independently selected from alkyl and optionally substituted phenyl.

4. The method of claim 3, wherein said co-catalyst is [PhNMe$_2$H][B(C$_6$F$_5$)$_4$] or Si(CH$_2$CH$_3$)$_3$[B(C$_6$F$_5$)$_4$].

5. The method of claim 1, wherein said metallocene pre-catalyst and said co-catalyst are contacted in a metallocene pre-catalyst:co-catalyst ratio of about 1.2:1-100:1.

6. The method of claim 5, wherein said metallocene pre-catalyst and said co-catalyst are contacted in a metallocene pre-catalyst:co-catalyst ratio of about 2:1.

7. The method of claim 1, wherein said co-catalyst is added in an amount of about 1-5 mole % of said metallocene pre-catalyst.

8. The method of claim 1, wherein said metallocene pre-catalyst is contacted with a substoichiometric amount of a co-catalyst in an inert solvent.

9. The method of claim 8, wherein said solvent is chlorobenzene, dichlorobenzene, isopentane, hexane, cyclohexane, heptane, benzene, toluene, trifluorotoluene, pentane, octane, isooctane or dichloromethane.

10. The method of claim 1, wherein said metallocene pre-catalyst and said co-catalyst are contacted at a temperature of about −20° C. to about 10° C.

11. The method of claim 1, wherein said first olefin monomer is ethene, propene, 1-butene, 1-pentene, 1-hexene, 1-heptene, 1-octene, styrene, alpha-methyl styrene, butadiene, isoprene, acrylonitrile, methyl acrylate, methyl methacrylate, vinyl acetate, vinyl chloride, vinyl fluoride, vinylidene chloride, N-vinyl pyrrolidone, 3-methylbutene, 3-methyl-1-pentene, vinylcyclohexane, vinylcyclobutane, vinylcyclopentane, vinylcyclooctane, 1-decene, enantiomerically pure β-citronellene, 3,5,5-trimethyl-1-hexene or 4-methyl-1-pentene.

12. The method of claim 1, wherein said first olefin monomer is a non-conjugated diene having the formula:

wherein $X=CH_2$, CO, $N(R^{13})$, O or S;
$R^{11}$, $R^{12}$ and $R^{13}$ are each independently H, alkyl or phenyl; and
n and m are each independently an integer from 0-5.

13. The method of claim 1, wherein said first olefin monomer is 1,4-pentadiene, 1,5-hexadiene, 5-vinyl-2-norbornene, 1,7-octadiene, vinylcyclohexene, dicyclopentadiene, butadiene, isobutylene, isoprene or ethylidene norbornene.

14. The method of claim 1, wherein said metallocene pre-catalyst and said first olefin monomer are added in a metallocene pre-catalyst:first monomer ratio of about 1:10-1:10,000.

15. The method of claim 14, wherein said ratio is about 1:10.

16. The method of claim 14, wherein said ratio is about 1:100.

17. The method of claim 14, wherein said ratio is about 1:1000.

18. The method of claim 1, further comprising contacting said polyolefin with a second amount of said co-catalyst; adding a second olefin monomer; and polymerizing said second olefin monomer to form a block-polyolefin composition.

19. The method of claim 18, wherein said second amount of co-catalyst is about a stoichiometric amount or more of said metallocene pre-catalyst.

20. The method of claim 18, wherein said second amount is a metallocene pre-catalyst:co-catalyst ratio of about 0.5:1-2:1.

21. The method of claim 18, wherein said metallocene pre-catalyst and said second olefin monomer are added in a metallocene pre-catalyst:second monomer ratio of about 1:10-1:10,000.

22. The method of claim 21, wherein said ratio is about 1:10.

23. The method of claim 21, wherein said ratio is about 1:100.

24. The method of claim 21, wherein said ratio is about 1:1000.

25. The method of claim 18, wherein said first olefin and second olefin are independently ethene, propene, 1-butene, 1-pentene, 1-hexene, 1-heptene, 1-octene, styrene, alpha-methyl styrene, butadiene, isoprene, acrylonitrile, methyl acrylate, methyl methacrylate, vinyl acetate, vinyl chloride, vinyl fluoride, vinylidene chloride, N-vinyl pyrrolidone, 3-methyl-butene, 3-methyl-1-pentene, vinylcyclohexane, vinylcyclobutane, vinylcyclopentane, vinylcyclooctane, 1-decene, enantiomerically pure β-citronellene, 3,5,5-trimethyl-1-hexene or 4-methyl-1-pentene.

26. The method of claim 18, wherein said first olefin monomer and said second olefin monomer are independently non-conjugated dienes having the formula:

wherein $X=CH_2$, CO, $N(R^{13})$, O or S;
$R^{11}$, $R^{12}$ and $R^{13}$ are each independently H, alkyl or phenyl; and
n and m are each independently an integer 0-5.

27. The method of claim 25, wherein said first olefin and said second olefin are the same.

28. The method of claim 18, wherein said polyolefin is an atactic living polyolefin.

29. The method of claim 18, wherein said block-polyolefin composition comprises a diblock copolymer having the formula: atactic-poly(first olefin)-b-isotactic-poly(second olefin).

30. The method of claim 29, wherein said atactic-poly(first olefin) block has degree of polymerization about equal to said isotactic-poly(second olefin) block.

31. The method of claim 29, wherein said diblock copolymer composition has polydispersity about 1.02-1.1.

32. The method of claim 31, wherein said polydispersity is about 1.05.

33. The method of claim 29, wherein said diblock copolymer is monomodal.

34. The method of claim 1, wherein said polyolefin is an isotactic polyolefin having polydispersity index of about 1.02-1.1.

35. The method of claim 1, wherein said contacting said metallocene pre-catalyst with said substoichiometric amount of said co-catalyst comprises forming an active metallocene catalyst; and said polymerizing by degenerative transfer comprises reacting said first monomer with said active metallocene catalyst to form an active propagating center.

36. The method of claim 35, wherein said polymerizing by degenerative transfer further comprises reacting said propagating center with said metallocene pre-catalyst to form a dormant chain and an active metallocene catalyst.

37. The method of claim 36, wherein said reacting comprises transferring a methyl group from said metallocene pre-catalyst to said active propagating center to form said active metallocene catalyst and said dormant chain.

38. The method of claim 36, wherein said polymerizing by degenerative transfer further comprises transferring a methyl group between said active propagating center and said dormant chain.

39. A method of producing a polyolefin composition comprising contacting a metallocene pre-catalyst with a co-catalyst and an olefin; and polymerizing said olefin by degenerative transfer Ziegler-Natta polymerization, wherein said metallocene has the formula:

wherein each $R^1$ is independently hydrogen or alkyl or two adjacent $R^1$ form an aromatic ring;

each $R^2$ and $R^3$ is independently alkyl, cycloalkyl, Si(alkyl)$_3$, Si(aryl)$_3$, phenyl, optionally substituted phenyl, or alkylphenyl; and each $R^5$ is halo, alkyl, cycloalkyl, aryl or arylalkyl.

40. The method of claim 39, wherein said metallocene pre-catalyst has the formula:

* * * * *